United States Patent [19]
Tohji et al.

[11] Patent Number: 5,950,430
[45] Date of Patent: Sep. 14, 1999

[54] CONSTRUCTION MACHINE

[75] Inventors: Yutaka Tohji; Kazuhiko Fujii; Kazuyuki Doi, all of Hiroshima, Japan

[73] Assignee: Kabushiki Kaisha Kobe Seiko Sho, Kobe, Japan

[21] Appl. No.: 08/885,135

[22] Filed: Jun. 30, 1997

[30] Foreign Application Priority Data

Jun. 28, 1996 [JP] Japan .................................. 8-188096

[51] Int. Cl.$^6$ .................................................. F16D 31/02
[52] U.S. Cl. .............................................. 60/426; 60/469
[58] Field of Search ...................... 60/426, 469; 91/512, 91/517, 444

[56] References Cited

FOREIGN PATENT DOCUMENTS

| | | |
|---|---|---|
| 0 454 923 | 11/1991 | European Pat. Off. . |
| 0 481 501 | 4/1992 | European Pat. Off. . |
| 0 695 875 | 2/1996 | European Pat. Off. . |
| 3-41203 | 4/1991 | Japan . |
| 3-241123 | 10/1991 | Japan . |
| 7-48863 | 2/1995 | Japan . |
| 8-105076 | 4/1996 | Japan . |
| WO 95/07231 | 3/1995 | WIPO . |

OTHER PUBLICATIONS

Patent Abstracts of Japan, vol. 16, No. 262 (M–1265), Jun. 15, 1992, JP 04–064597, Feb. 28, 1992.
Patent Abstracts of Japan, vol. 95, No. 4, May 31, 1995, JP 07–026587, Jan. 27, 1995.
Patent Abstracts of Japan, vol. 11, No. 218 (M–607), Jul. 15, 1987, JP 62–033946, Feb. 13, 1987.
Patent Abstracts of Japan, vol. 16, No. 422 (M–1305), Sep. 4, 1992, JP 04–143324, May 18, 1992.

*Primary Examiner*—F. Daniel Lopez
*Attorney, Agent, or Firm*—Oblon, Spivak, McClelland, Maier & Neustadt, P.C.

[57] ABSTRACT

In a construction machine of a small rotational inertia such as an intrawidth swing machine or a small-sized excavator, a rotative operability varies depending on the posture of a working attachment, and in a reduced state of reach, a change in rotating force is oversensitive to the operation of a working lever, so operation is difficult. To cope with this point, means for detecting the operation of a rotating direction control valve is provided, and an outlet of a center bypassing oil path in the rotating direction control valve and an oil tank are brought into communication with each other through a cut-off valve used for controlling the bleed-off thereof. Further, a pilot port of the cut-off valve and a source of a pilot oil pressure are brought into communication with each other through an electromagnetic proportional pressure reducing valve, and an operation command signal is issued from a controller to the electromagnetic proportional pressure control valve to control the acceleration of rotation and the maximum rotating speed.

16 Claims, 11 Drawing Sheets

CONSTRUCTION MACHINE

BACKGROUND OF THE INVENTION 1. (Field of the Invention)

The present invention relates mainly to a construction machine having an upper rotating structure. Particularly, the invention is concerned with a control circuit in a hydraulic excavator.

2. (Description of the Related Art)

FIG. 10 is a circuit diagram of a rotating motor described in Japanese Utility Model Laid Open No. 41203/91.

In the rotating circuit of the prior art shown in FIG. 10, when a rotating hydraulic remote control valve 2 for starting the operation of a rotating motor 1 is operated, a secondary pilot pressure derived from the valve 2 acts on pressure increasing ports 4L and 4R of relief valves 3L and 3R, respectively, whereby the relief valves 3L and 3R are set at a high relief pressure. As a result, the starting torque of the rotating motor 1 is increased and a satisfactory accelerating performance can be exhibited at the time of start-up of rotation.

For stopping the rotation of an upper rotating structure, the rotating hydraulic remote control valve 2 is returned to its neutral position, whereby the secondary pilot pressure is no longer exerted on the pressure increasing ports 4L and 4R, so that the set pressure for the relief valves 3L and 3R shifts to a lower pressure side. Thus, a braking force working on the rotating motor 1 does not act abruptly. In other words, since the braking force for the motor 1 copes flexibly with the force of inertia of the upper rotating structure, there is performed a smooth stop of the upper rotating structure.

FIG. 11 is a side view showing the posture of a working attachment 7 attached to an upper rotating structure 6 of an hydraulic excavator 5.

The working attachment 7 comprises a boom 8, an arm 9, and a bucket 10 as a working tool, which are connected successively with one another. As shown in phantom in FIG. 11, when the boom 8 is brought down and the arm 9 extended, a working radius R from a rotation center O—O of the upper rotating structure 6 to the front end portion of the arm 9 is long. In this state, an inertial mass of the upper rotating structure 6 is large. A rotation starting force of a rotating motor 11 is set so as to permit start-up of rotation even in the case of a large inertial mass. On the other hand, when the boom 8 is raised and the arm 9 retracted, as indicated with solid line in FIG. 11, a working radius, r, from the rotation center O—O of the upper rotating structure 6 to the front end portion of the arm 9 is short, and the inertial mass of the upper rotating structure 6 is small. Particularly, in the case of a construction machine with a small rotational inertia such as, for example, an intra-width swing machine or a small-size excavator, the operability for rotation varies markedly according to the posture of the working attachment. In a reduced state of the working radius of the working attachment, a change in rotational force, which occurs in response to the operation of a lever for actuating a hydraulic cylinder for the boom or for the arm, is oversensitive and therefore operation is difficult. This problem occurs also in a rotating operation with a small working load imposed on the boom or in a combined operation for both traveling and rotation. Anyhow, it cannot be said that the operator is given a comfortable feeling in the rotating operation.

SUMMARY OF THE INVENTION

It is an object of the present invention to provide a control circuit capable of sensing a boom angle, or both boom angle and arm angle, and the state of a working load, thereby reading the posture of a working attachment, and restricting the acceleration of rotation and the maximum speed.

The present invention relates to a construction machine having a lower carriage, an upper rotating structure mounted rotatably on the lower carriage, and a working attachment attached rotatably to the upper rotating structure. The construction machine of the present invention further includes working radius detecting means for detecting a working radius on the basis of the state of the working attachment, rotative acceleration suppressing means for suppressing the acceleration of rotation of the upper rotating structure when it is detected by the working radius detecting means that the working radius is small, and maximum rotating speed suppressing means for suppressing a maximum rotating speed of the upper rotating structure when it is detected by the working radius detecting means that the working radius is small.

The rotative acceleration suppressing means and the maximum rotating speed suppressing means both used in the present invention may each be constituted by an unloading valve, which controls the bleed-off of a rotating direction control valve in accordance with the working radius. As the said unloading valve there may be used a cut-off valve which controls the bleed-off by on-off operation.

In this case, control may be made in such a manner that, when the working radius is reduced, the bleed-off of the cut-off valve is controlled to permit opening in response to the operation of the rotating direction control valve to suppress the acceleration of rotation of the upper rotating structure and that the bleed-off of the cut-off valve is controlled so as not to be fully closed, thereby suppressing the maximum rotating speed of the upper rotating structure.

An outlet of a center bypassing oil path for the return of main pressure oil, which extends through a neutral position of the rotating direction control valve, and an oil tank may be brought into communication with each other through the above cut-off valve. Using an electromagnetic proportional pressure reducing valve, the cut-off valve may be controlled in accordance with the working radius.

The unloading valve may be connected to three valves, the rotating direction control valve, a boom (or arm) direction control valve, and a traveling direction control valve. In this case, it is preferable that priority be set to the operation of the rotating direction control valve.

Further, the unloading valve may be operated in accordance with a detected load pressure of a hydraulic cylinder for rotating a boom. In this case, control may be made in such a manner that, with a decrease of the load pressure, the bleed-off of the cut-off valve is controlled to permit opening in response to the operation of the rotating direction control valve to suppress the rotative acceleration of the upper rotating structure and that the bleed-off of the cut-off valve is controlled so as not to be fully closed, thereby suppressing the maximum rotating speed.

In the construction machine of the present invention, both rotative acceleration and maximum rotating speed of the upper rotating structure can be suppressed. Accordingly, it is possible to improve both operability and safety.

DESCRIPTION OF THE PREFERRED EMBODIMENTS

Embodiments of the present invention will be described in detail hereinunder with reference to the accompanying drawings.

Figure 1:
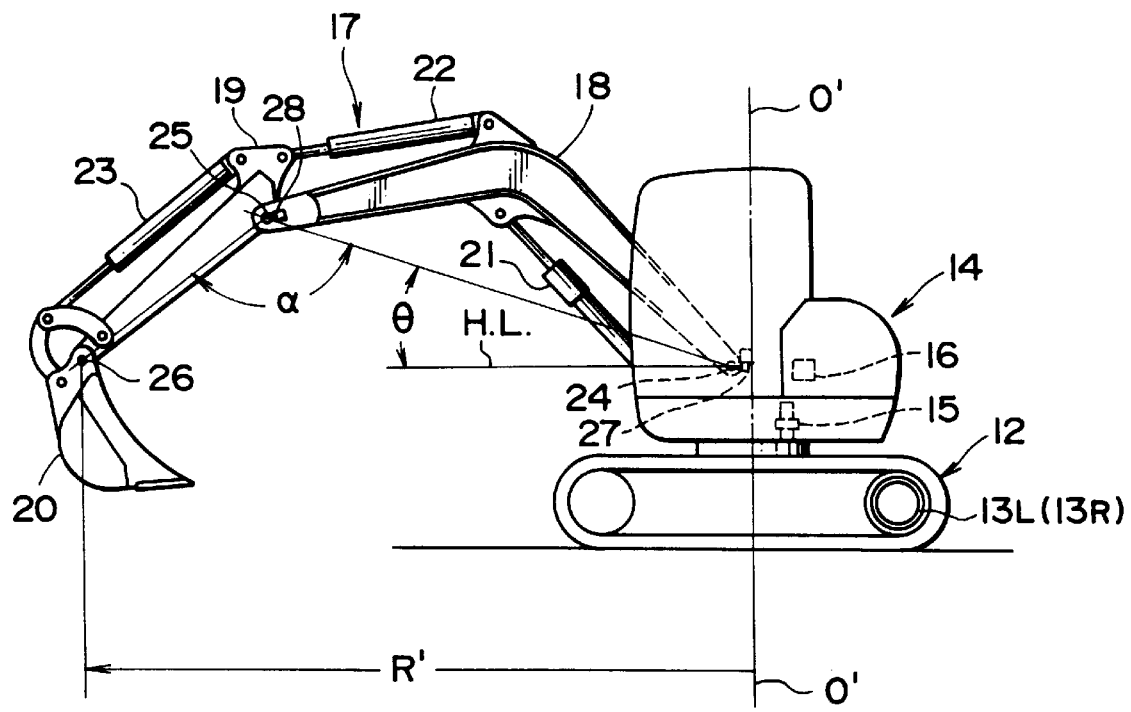
FIG. 1 is a side view of a hydraulic excavator equipped with a control circuit according to the present invention.

FIG. 1 is a side view of a hydraulic excavator provided with a control circuit according to the present invention. In the same figure, the reference numeral 12 denotes a lower carriage of the hydraulic excavator. Numerals 13L and 13R denote a pair of left and right traveling motors for driving the lower carriage 12. The right-hand traveling motor 13R is not visible because it is on the opposite side of the left-hand traveling motor 13L. Numeral 14 denotes an upper rotating structure connected to the upper portion of the lower carriage 12. Numeral 15 denotes a rotating motor mounted in the interior of the upper rotating structure 14. Numeral 16 denotes a controller. Numeral 17 denotes a working attachment attached to the upper rotating structure 14. Numerals 18, 19 and 20 denote a boom, an arm, and a bucket as a working tool, respectively. Numerals 21, 22 and 23 denote a boom cylinder, an arm cylinder, and a bucket cylinder, respectively. Numeral 24 denotes a pin connection for connection between a base end portion of the boom 18 and a boom mounting bracket (not shown) of the upper rotating structure 14. Numeral 25 denotes a pin connection for connection between a front end portion of the boom 18 and a base end portion of the arm 19. Numeral 26 denotes a pin connection for connection between a front end portion of the arm 19 and a base portion of the bucket 20. Numeral 27 denotes a potentiometer attached to the pin connection 24 to detect the posture of the boom 18. Numeral 28 denotes a potentiometer attached to the pin connection 25 to detect the posture of the arm 19. The reference mark θ denotes a boom angle between a straight line joining the pin connections 24 and 25 and a horizontal line (H.L.). The mark a denotes an arm angle between a straight line joining the pin connections 24 and 25 and a straight line joining the pin connections 25 and 26. The distance R' is equal to the working radius (the so-called reach of the working attachment) from a rotational center O'—O' of the upper rotating structure 14 to the front end portion of the arm 19.

Figure 2:
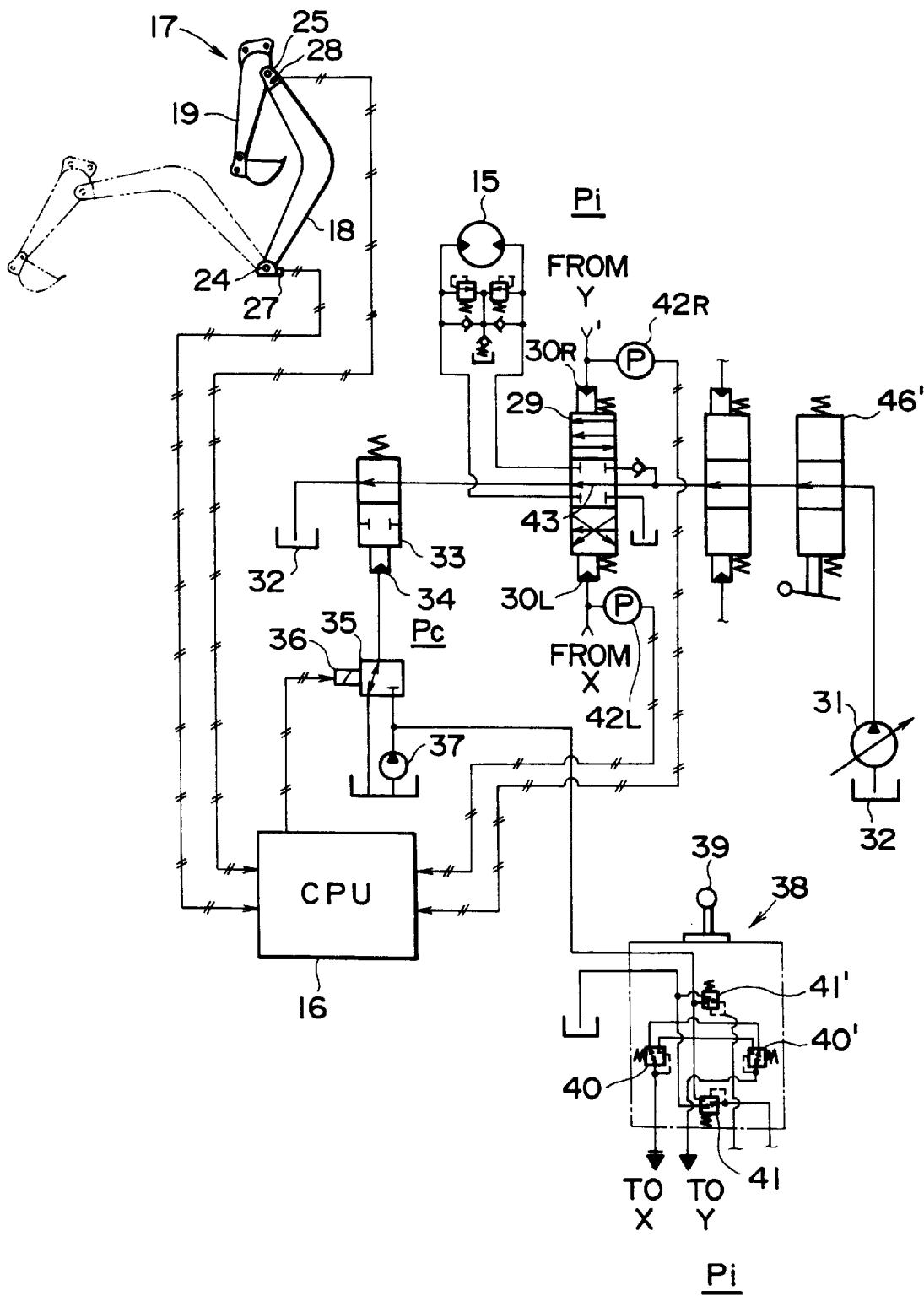
FIG. 2 is a control circuit diagram according to the first embodiment of the present invention.

FIG. 2 is a control circuit diagram in the first embodiment of the present invention.

In FIG. 2, the numeral 29 denotes a rotating direction control valve for controlling the rotating motor 15. Numerals 30L and 30R denote left and right pilot ports of the rotating direction control valve 29. Numeral 31 denotes a main pump, numeral 32 denotes an oil tank, numeral 33 denotes a cut-off valve used as an unloading valve, and numeral 34 denotes a pilot port of the cut-off valve 33. Further, numeral 35 denotes an electromagnetic proportional pressure reducing valve, and numeral 36 denotes a solenoid of the valve 35. Numeral 37 denotes a pilot pump as an oil pressure source in a pilot circuit. Numeral 38 denotes a hydraulic remote control valve for work. Numeral 39 denotes an operating lever for the hydraulic remote control valve 38. Numerals 40, 40',41 and 41' denote pilot valves each of which produces a secondary pilot pressure upon tilting of the operating lever 39. The marks X and Y represent connections of pilot lines.

Figure 3:
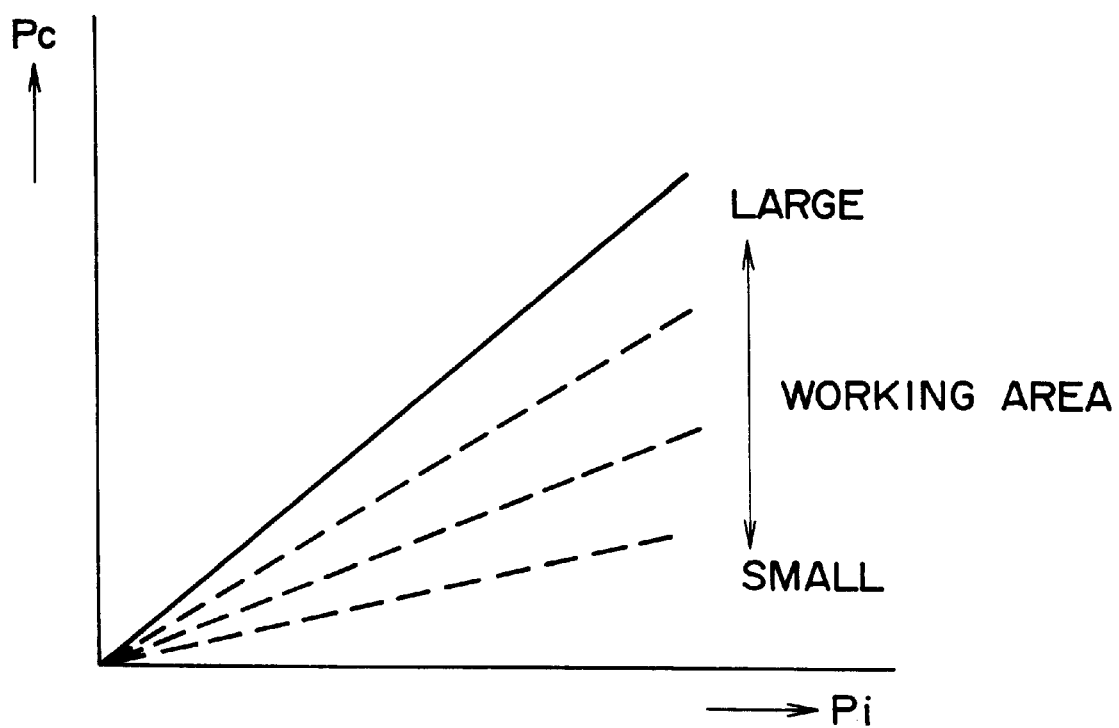
FIG. 3 is a graph showing a relation between a pilot pressure for rotation acting on pilot ports of a rotating direction control valve and an operation command pilot pressure derived from an electromagnetic proportional pressure reducing valve.

FIG. 3 shows a relation between a pilot pressure Pi for rotation (the secondary pilot pressure derived from the pilot valve 40 or 40') acting on the pilot ports 30L and 30R of the rotating direction control valve 29 and an operation command pilot pressure Pc derived from the electromagnetic proportional pressure reducing valve 35. As shown in FIG. 3, the larger the working radius, the larger the inclination of a straight line which indicates the relation between the pilot pressure Pi for rotation and the operation command pilot pressure Pc.

The control circuit in the first embodiment of the present invention will now be described with reference to FIGS. 1 to 3. As means for detecting the posture of the working attachment 17, potentiometers 27 and 28 are provided for the boom 18 and arm 19, respectively. Further, as means for detecting the operation of the rotating direction control valve 29, pressure sensors 42L and 42R (both shown in FIG. 2) are provided for the pilot ports 30L and 30R, respectively. An outlet of a center bypassing oil path 43 for the return of a main pressure oil, which oil path extends through a neutral position of the rotating direction control valve 29, and the oil tank 32 are in communication with each other through the cut-off valve 33 which performs opening and closing motions selectively to control the bleed-off thereof The pilot port 34 of the cut-off valve 33 and the pilot pump 37 are in communication with each other through the electromagnetic proportional pressure reducing valve 35. The controller 16 forms a judgment on detection signals provided from the potentiometers 27, 28 and the pressure sensors 42L, 42R and then provides an operation command signal to the solenoid 36 of the pressure reducing valve 35, which in turn exerts an operation command pilot pressure Pc to the pilot port 34 of the cut-off valve 33.

The following description is now provided about the operation of the control circuit in the first embodiment. While the hydraulic excavator is performing a work under rotation thereof, a boom angle θ detection signal and an arm angle a detection signal are fed to the controller 16 from the potentiometers 27 and 28, respectively. Further, rotating operation detection signals are fed to the controller 16 from the pressure sensors 42L and 42R. The controller 16 forms a judgment on the basis of those detection signals and then outputs a command signal to the solenoid 36 of the electromagnetic proportional pressure reducing valve 35. The valve 35 then operates and generates an operation command pilot pressure Pc, which operates on the pilot port 34 of the cut-off valve 33.

In the above case, as shown in FIG. 3, the pilot pressure Pi for rotation derived from the pilot valve 40 or 40' of the hydraulic remote control valve 38 in a rotating operation and the operation command pilot pressure Pc of a value corresponding to the working radius R' up to the front end portion of the working attachment 17 are outputted to the pilot port 34 of the cut-off valve 33 in accordance with the judgment made by the controller 16. Therefore, when the working radius R' of the working attachment 17 is reduced, if the bleed-off of the cut-off valve 33 is controlled in a rather opening direction in response to the operation of the rotating direction control valve 29, it becomes possible to suppress the rotative acceleration of the upper rotating structure 14. Further, by controlling the bleed-off of the cut-off valve 33 so as not to be fully closed, it is made possible to suppress the maximum rotating speed. To be more specific, a low maximum rotating speed results in the braking inertia being also small, and it is possible to improve the operability and safety at a small reach and at a total of acceleration and deceleration.

Although in this embodiment the pilot pressure Pi for rotation and a command value of the operation command pilot pressure Pc derived in accordance with the working radius R' are set so as to change linearly, as shown in FIG. 3, there is made no limitation to such a linear change. The change in question may be non-linear insofar as there is attained operability which matches the construction machine.

Figure 4:
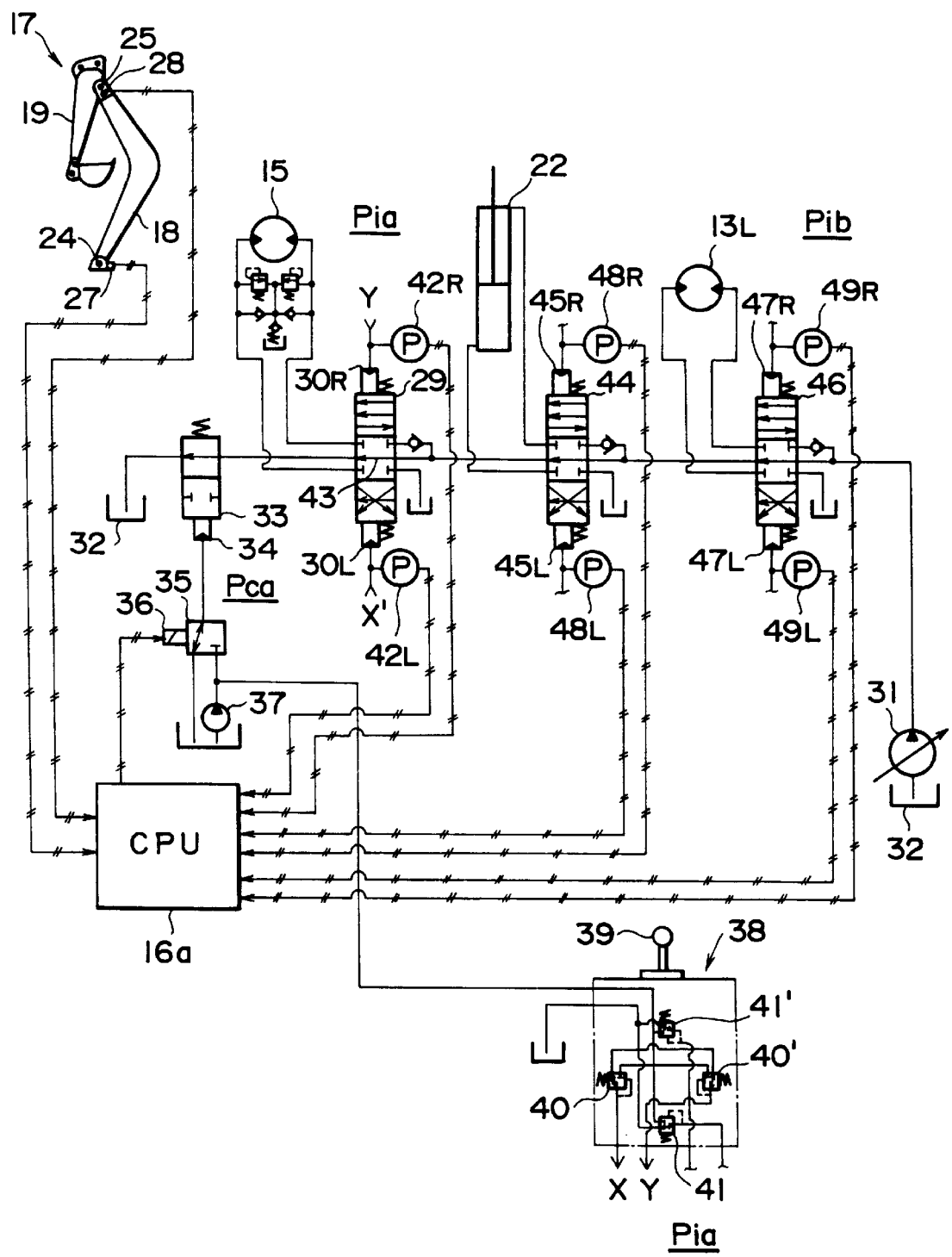
FIG. 4 is a control circuit diagram according to the second embodiment of the present invention.

FIG. 4 is a control circuit diagram according to the second embodiment of the present invention. In FIG. 4, the same components as in the control circuit of the first embodiment shown in FIGS. 1 and 2 are indicated by the same reference numerals.

Numeral 44 denotes an arm direction control valve for controlling the arm cylinder 22. Numerals 45L and 45R denote pilot ports of the arm direction control valve 44. Numeral 46 denotes a traveling direction control valve for controlling the (left) traveling motor 13L. Numerals 47L and 47R denote pilot ports of the traveling direction control valve 46. Numeral 16a denotes a controller.

Figure 5:
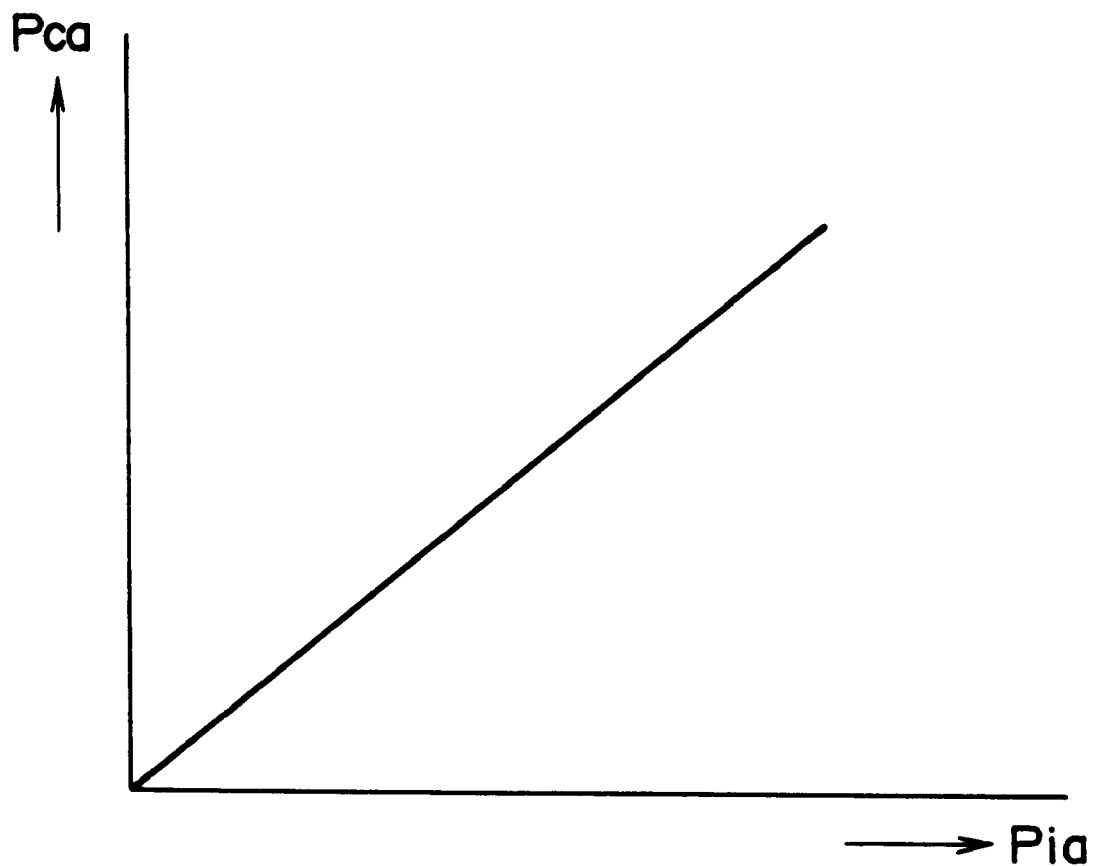
FIG. 5 is a graph showing a relation between an arm pilot pressure acting on pilot ports of an arm direction control valve and an operation command pilot pressure derived from the electromagnetic proportional pressure reducing valve.

FIG. 5 is a graph showing a relation between a pilot pressure Pi for the arm which pressure works on the pilot ports 45L and 45R of the arm direction control valve 44 and an operation command pilot pressure Pca derived from an electromagnetic proportional pressure reducing valve 35.

Figure 6:
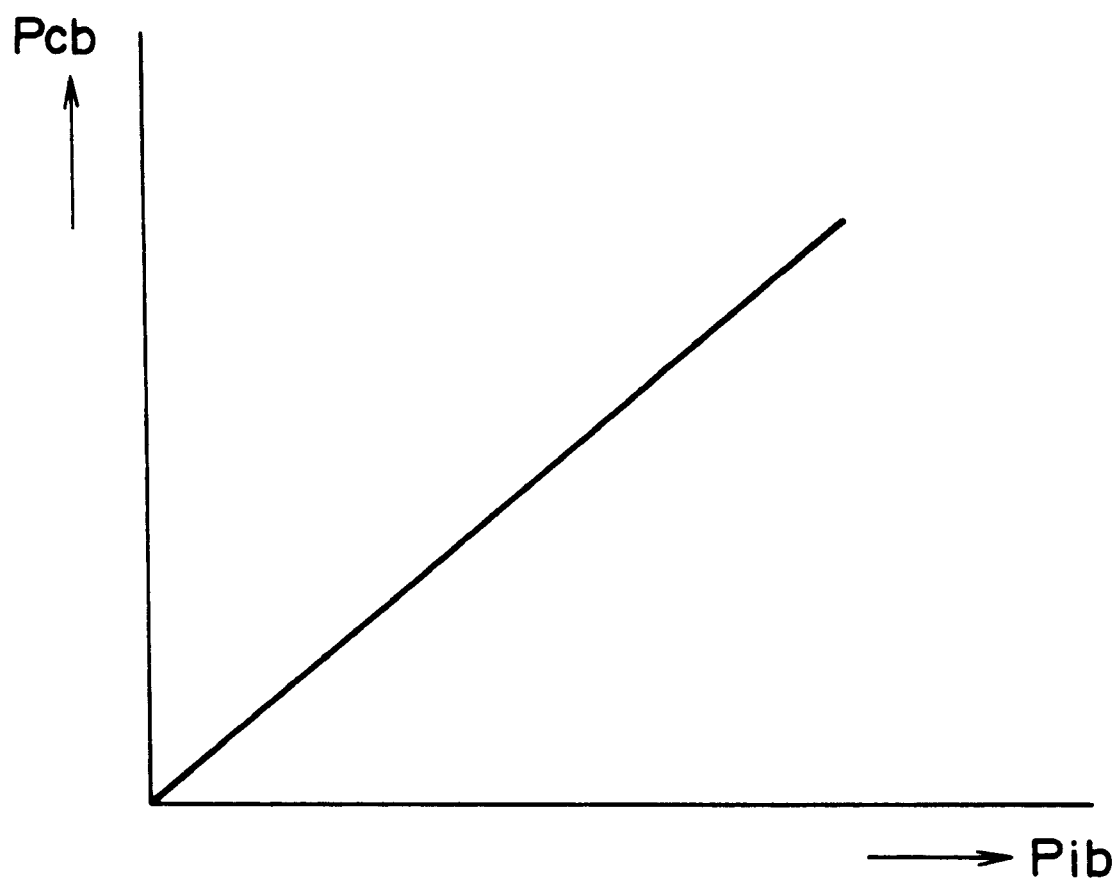
FIG. 6 is a graph showing a relation between a traveling pilot pressure acting on pilot ports of a traveling direction control valve and an operation command pilot pressure derived from the electromagnetic proportional pressure reducing valve.

FIG. 6 is a graph showing a relation between a traveling pilot pressure Pib acting on the pilot ports 47L and 47R of the traveling direction control valve 46 and an operation command pilot pressure Pcb derived from the electromagnetic proportional pressure reducing valve 35. A pilot valve for outputting the traveling pilot pressure Pib is not shown.

Also in this second embodiment the relation between a rotating pilot pressure Pi acting on pilot ports 30L and 30R of a rotating direction control valve 29 and an operation command pilot pressure derived from the electromagnetic proportional pressure reducing valve 35 is the same as the relation shown in FIG. 3. Although the traveling direction control valve 46' used in the first embodiment is a push-pull type, the traveling direction control valve 46 used in the control circuit of this second embodiment is a hydraulic remote control type.

The construction of the control circuit in the second embodiment will now be described with reference to FIGS. 4 to 6. As means for detecting the posture of the working attachment 17 there are provided the potentiometers 27 and 28 for boom 18 and arm 19. Further, as means for detecting the operation of the rotating direction control valve 29 there are provided the pressure sensors 42L and 42R for the pilot ports 30L and 30R. As means for detecting the operation of the arm cylinder 22 there are provided pressure sensors 48L and 48R for the pilot ports 45L and 45R of the arm direction control valve 44. As means for detecting the operation of the traveling motor 13L there are provided pressure sensors 49L and 49R for the pilot ports 47L and 47R of the traveling direction control valve 46. The output of a center bypassing oil path 43 for the return of a main pressure oil, which oil path extends through neutral positions of the direction control valves 46, 44 and 29 for traveling, for arm and for rotation, respectively, and the oil tank 32 are in communication with each other through the cut-off valve 33 which is adapted for opening and closing motion to control the bleed-off thereof. The pilot port 34 of the cut-off valve 33 and the pilot pump 37 are in communication with each other through the electromagnetic proportional pressure reducing valve 35. Detection signals provided from the potentiometers 27, 28 and the pressure sensors 42L, 42R, 48L, 48R, 49L and 49R are subjected to judgment by the controller 16a, which in turn outputs an operation command signal to the solenoid 36 of the electromagnetic proportional pressure reducing valve 35, whereby the operation command pilot pressure Pc, Pca, or Pcb, is exerted on the pilot port 34 of the cut-off valve 33 from the valve 35. Detection signals provided from the pressure sensors 42L and 42R as means for detecting the operation of the rotating direction control valve 29 are subjected to the judgment in preference to detection signals provided from the pressure sensors 48L, 48R, 49L and 49R as means for detecting the operation of the traveling direction control valves 44 and 46.

Although a control valve for boom is not described in FIG. 4 which illustrates the second embodiment, it also may be used.

Description is now directed to the operation of the control circuit according to the second embodiment. When the hydraulic excavator is performing a work without rotation, boom angle θ detection signal and arm angle α detection signal from the potentiometers 27 and 28, arm cylinder operation detection signals from the pressure sensors 48L and 48R, and traveling motor operation detection signals from the pressure sensors 49L and 49R, are fed to the controlled 16a. The controller 16a forms a judgment on the basis of those detection signals and outputs a command signal to the solenoid 36 of the electromagnetic proportional pressure reducing valve 35. As a result, the valve 35 operates and operation command pilot pressures Pca and Pcb of such values as shown in FIGS. 5 and 6 are outputted to the pilot port 34 of the cut-off valve 33. In this way it is possible to perform the ordinary operation of the arm and traveling in a rotation-free condition. However, when the hydraulic excavator is performing a rotating operation, boom angle θ and arm angle α detection signals from the potentiometers 27 and 28, as well as rotating motor operation detection signals from the pressure sensors 42L and 42R, are fed to the controller 16a. In the controller 16a, detection signals provided from the pressure sensors 42L and 42R as means for detecting the operation of the rotating direction control valve 29 are subjected to judgment in preference to detection signals provided from the pressure sensors 48L, 48R, 49L and 49R as means for detecting the operation of the traveling direction control valves 44 and 46. Thus, it is possible to prevent the occurrence of pressure interference at the time of change-over of spool (not shown) in the arm direction control valve 44 and traveling direction control valve 46 which valves share the main pump 31 with each other. Accordingly, unlike the prior art, there is no fear that the change-over of spool in the arm direction control valve during rotation may result in dosing of bleed-off of the same valve and increase of rotation in decelerative control. As mentioned above, bleed-off of the arm direction control valve 44 and that of the traveling direction control valve 46, which share the main pump 31 with each other, are controlled by the cut-off valve 33. More specifically, if the arm is operated or operation for traveling is performed, other than rotation, in a rotation decelerating control, the control for the cut-off valve sets priority to a pilot pressure command for rotation, so the cut-off valve does not dose and hence a stable operability for rotation can be attained.

Figure 7:
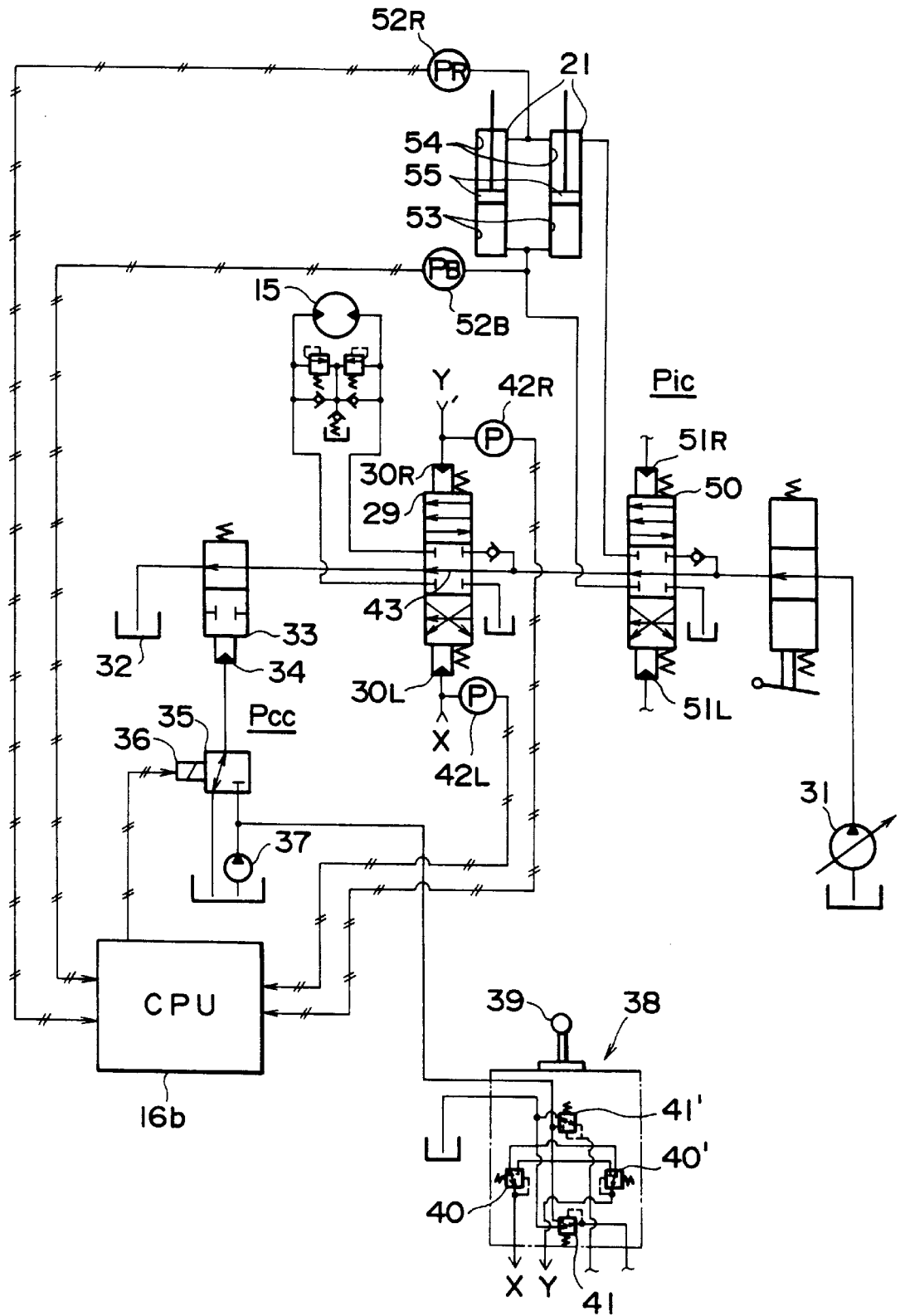
FIG. 7 is a control circuit diagram according to the third embodiment of the present invention.

FIG. 7 is a control circuit diagram according to the third embodiment of the present invention. In the same figure, the same components as in the control circuit of the first embodiment shown in FIGS. 1 and 2 are indicated by the same reference numerals as in FIGS. 1 and 2.

The numeral 50 denotes a boom direction control valve for controlling a boom cylinder 21. The boom cylinder sometimes comprises two cylinders, so in FIG. 7 there are illustrated two cylinders. Numerals 51L and 51R denote pilot ports of the boom direction control valve 50. Numeral 16b denotes a controller. Numeral 52B denotes a pressure sensor for detecting the pressure of a bottom-side oil chamber 53 of the boom cylinder 21. Numeral 52R denotes a pressure sensor for detecting the pressure of a rod-side oil chamber 54 of the boom cylinder 21.

Figure 8:
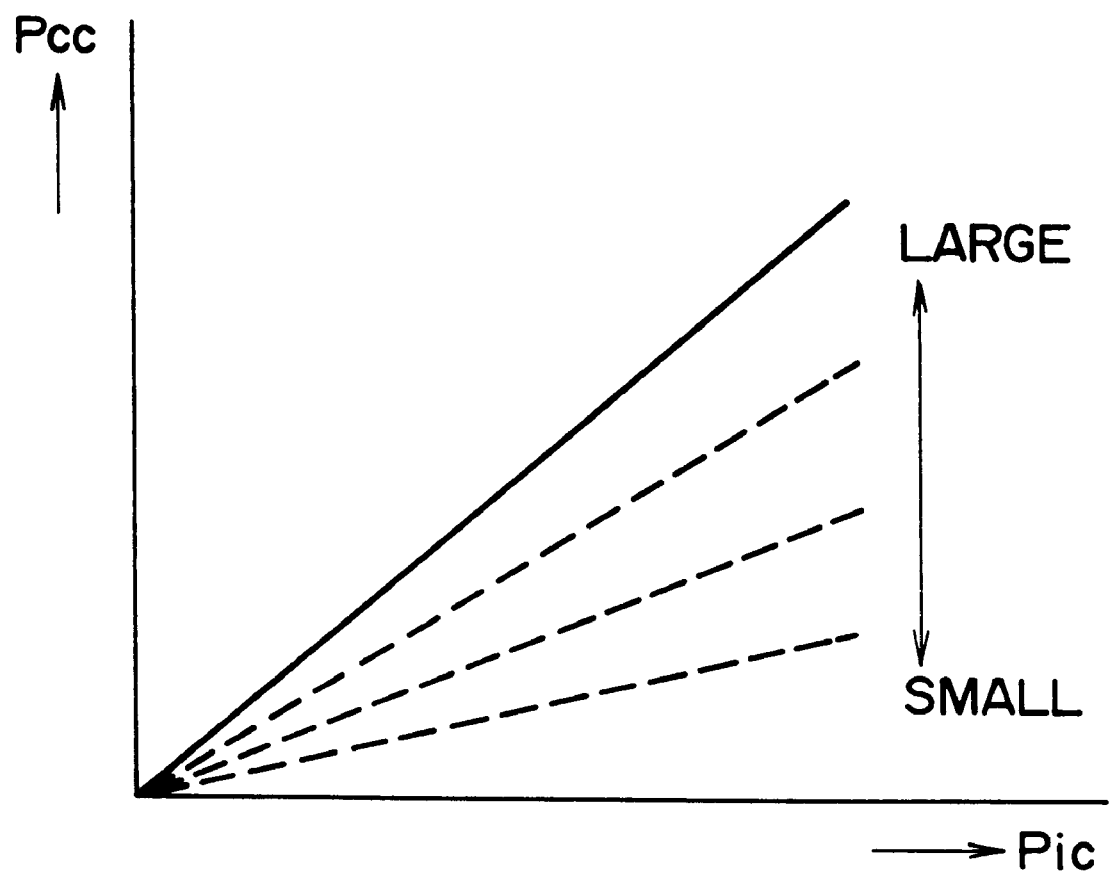
FIG. 8 is a graph showing a relation between a boom pilot pressure acting on pilot ports of a boom direction control valve and an operation command pilot pressure derived from the electromagnetic proportional pressure reducing valve.

FIG. 8 is a graph showing a relation between a pilot pressure Pic for the boom acting on the pilot ports 51L and 51R of the boom direction control valve 50 and an operation command pilot pressure $P_{CC}$ derived from an electromagnetic proportional pressure reducing valve 35. Given that the internal pressure of the bottom-side oil chamber 53 in the boom cylinder 21 is $P_B$, the internal pressure of the rod-side oil chamber 54 is $P_R$, a bottom-side pressure receiving area of a piston 55 in the boom cylinder 21 is $A_B$, and a rod-side pressure receiving area of the same piston is $A_R$, a boom load pressure, W, acting on the boom cylinder 21 during work is calculated by the controller 16b in accordance with the following formula:

$$W = P_B {}^*A_B - P_R {}^*A_R$$

Description is now directed to the construction of the control circuit according to the third embodiment with reference to FIGS. 7 and 8. As means for detecting the operation of a rotating direction control valve 29 there are provided the pressure sensors 42L and 42R for pilot ports 30L and 30R, respectively. As means for detecting a boom load pressure in the boom cylinder 21 there are provided pressure sensors 52B and 52R for the bottom-side oil chamber 53 and the rod-side oil chamber 54, respectively, in the boom cylinder 21. An outlet of a center bypassing oil path 43 for the return of a main pressure oil which oil path extends through a neutral position of the rotating direction control valve 29, and the cut-off valve 33 adapted for opening and dosing motions to control the bleed-off thereof. A pilot port 34 of the cut-off valve 33 and the pilot pump 37 are in communication with each other through the electromagnetic proportional pressure reducing valve 35. The controller 16b forms a judgment on detection signals provided from the pressure sensors 42L, 42R, 52B and 52R and outputs an operation command signal to a solenoid 36 of the electromagnetic proportional pressure reducing valve 35, thereby causing an operation command pilot pressure $P_{CC}$ to be exerted on the pilot port 34 of the cut-off valve 33 from the valve 35.

The operation of the control circuit according to the third embodiment will now be described. When a working load is imposed on the boom under rotation of the hydraulic excavator, rotating operation detecting signals from the pressure sensors 42L and 42R, as well as boom load pressure detection signals from the pressure sensors 52B and 52R, are fed to the controller 16b. The controller 16b performs an arithmetic processing on the basis of those detection signals and outputs a command signal to the solenoid of the electromagnetic proportional pressure reducing valve 35, which in turn operates and outputs an operation command pilot pressure $P_{CC}$ of such a value as shown in FIG. 8 to the pilot port 34 of the cut-off valve 33. When the boom load pressure is small, therefore, by controlling the bleed-off of the cut-off valve 33 in a rather opening direction in response to the operation of the rotating direction control valve 29, it is possible to suppress the rotative acceleration of the upper rotating structure 14. Further, by controlling the bleed-off of the cut-off valve 33 so as not to fully close, it is possible to suppress the maximum rotating speed. Thus, a small boom load pressure results in the braking inertia being also small and it is possible to improve both operability and safety at a small boom load pressure and at a total of acceleration and deceleration.

Figure 9:
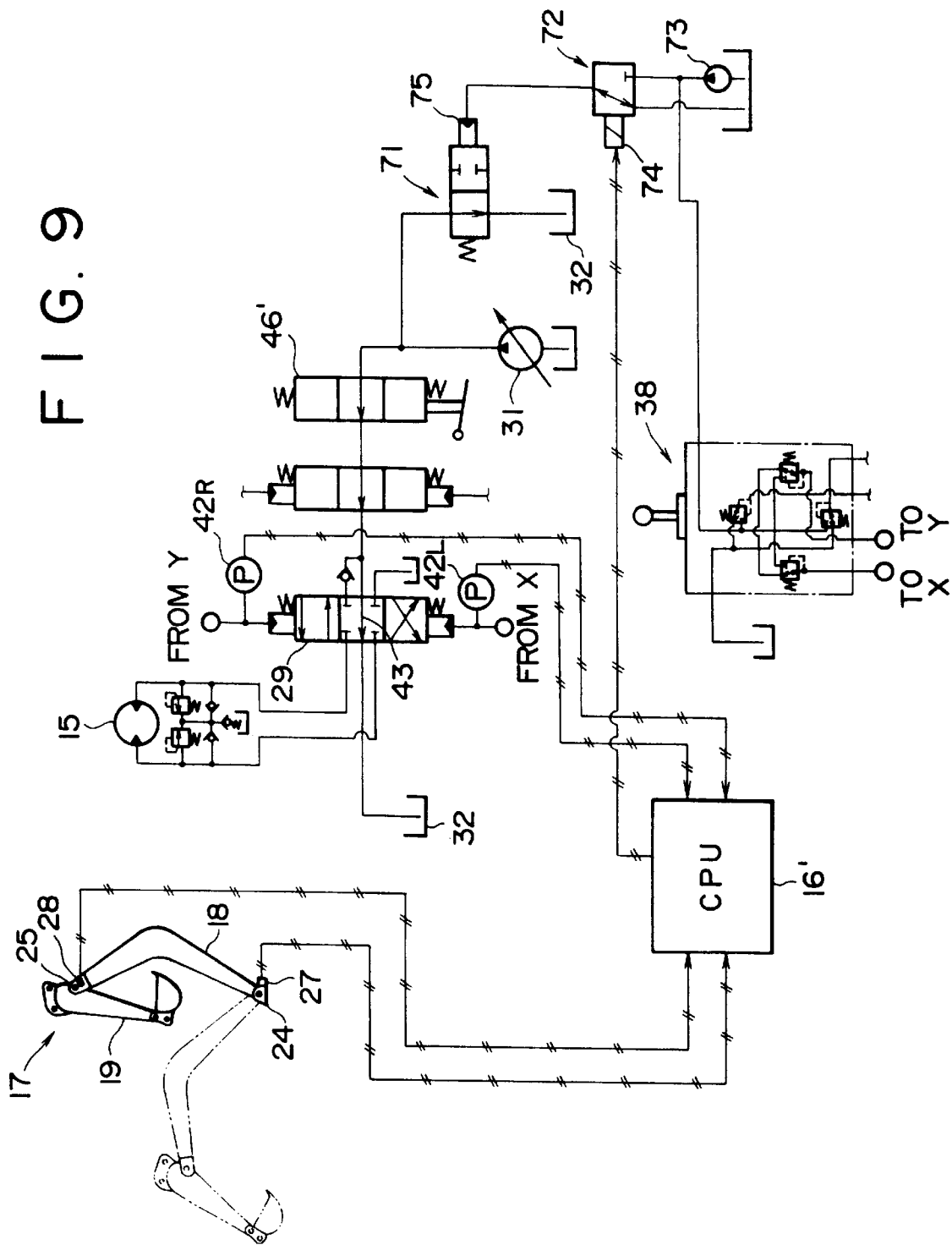
FIG. 9 is a control circuit diagram according to the fourth embodiment of the present invention.
Figure 10:
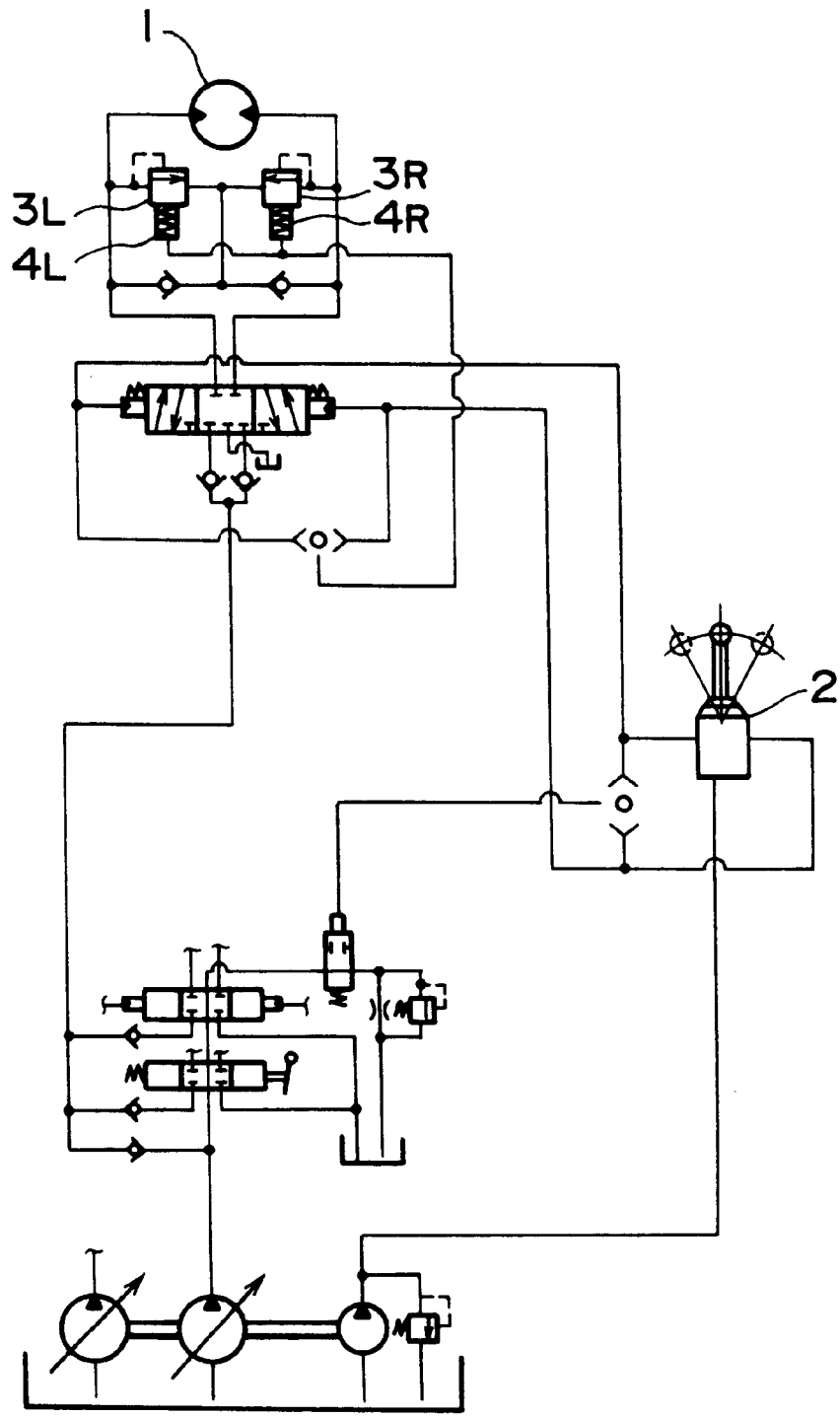
FIG. 10 is a rotating circuit diagram according to an example of the prior art.
Figure 11:
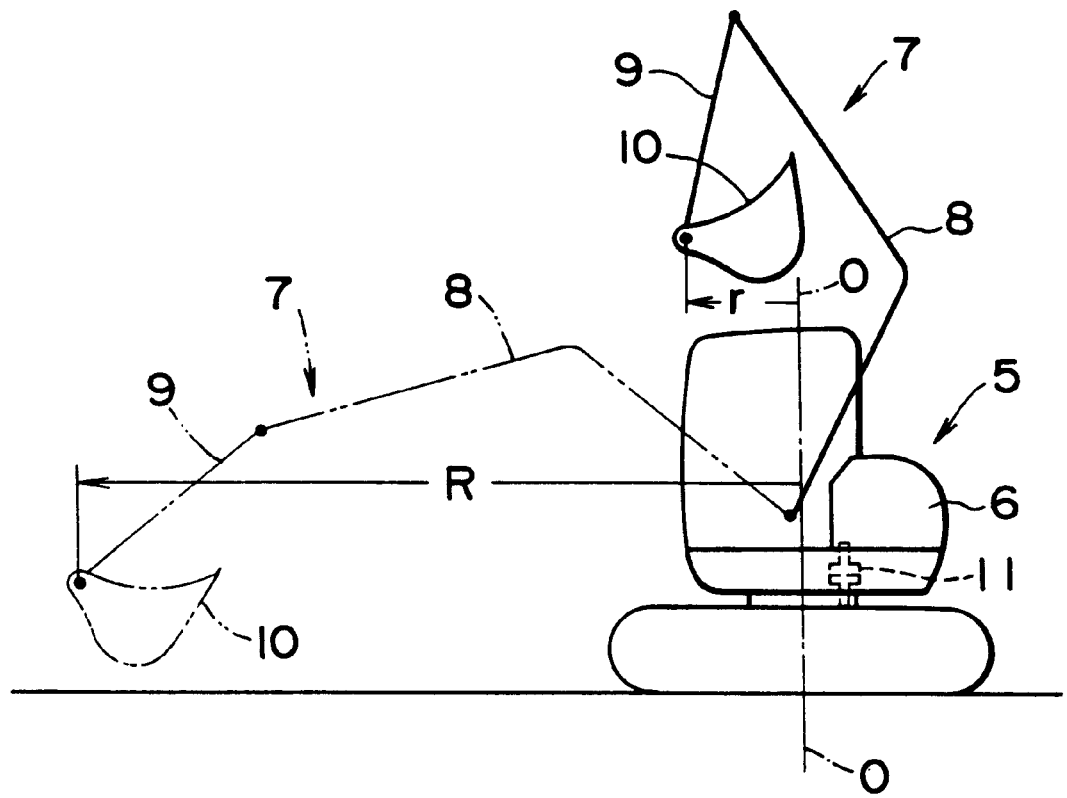
FIG. 11 is a side view showing the posture of a working attachment attached to a hydraulic excavator in the prior art.

FIG. 9 is a control circuit diagram according to the fourth embodiment of the present invention. In FIG. 9 the same components as in the control circuit of the first embodiment shown in FIGS. 1 and 2 are indicated by the same reference numerals as in FIGS. 1 and 2.

In the fourth embodiment, instead of the cut-off valve 33 connected in serial between the rotating direction control valve 29 and the oil tank 32 as shown in FIG. 2, another cut-off valve 71 is connected in parallel between the main pump 31 and the traveling direction control valve 46'. A pilot port 75 of the cut-off valve 71 is connected to a directional control valve 72. A pilot port 74 of the directional control valve 72 is electrically connected to a controller 16'. A pilot pump 73 and the hydraulic remote control valve 38 are connected to a port of the directional control valve 72. In the fourth embodiment shown in FIG. 9, the cut-off valve 71 controls the bleed-off amount from the main pump 31.

We claim:

1. A construction machine comprising
   a lower carriage;
   an upper rotating structure mounted rotatably on said lower carriage;
   a working attachment attached rotatably to said upper rotating structure;
   working radius detecting means for detecting a working radius in accordance with a state of said working attachment;
   rotative acceleration suppressing means for suppressing a rotative acceleration of said upper rotating structure when the working radius is found to be small by said working radius detecting means; and
   maximum rotating speed suppressing means for suppressing a maximum rotating speed of said upper rotating structure when the working radius is found to be small by said working radius detecting means, wherein said rotative acceleration suppressing means and said maximum rotating speed suppressing means include an unloading valve connected to a rotating direction control valve used for controlling rotation of said upper rotating structure, said unloading valve controlling bleed-off of said rotating direction control valve in accordance with the working radius detected by said working radius detecting means.

2. A construction machine according to claim 1, wherein said unloading valve is a cut-off valve adapted for opening and closing motions to control the bleed-off thereof.

3. A construction machine according to claim 2, wherein, when a reduced working radius is detected by said working radius detecting means, the bleed-off of said cut-off valve is controlled to permit opening in response to the operation of said rotating direction control valve to suppress the rotative acceleration of said upper rotating structure, and the maximum rotating speed is suppressed by controlling the bleed-off of the cut-off valve so as not to be fully closed.

4. A construction machine according to claim 2, wherein an outlet of a center bypassing oil path for return of a main pressure oil, said center bypassing path extending through a neutral position of said rotating direction control valve, and an oil tank are in communication with each other through said cut-off valve.

5. A construction machine according to claim 4, wherein a pilot port of said cut-off valve and a source of a pilot oil pressure for supply of an oil pressure to said pilot port are in communication with each other through an electromagnetic proportional pressure controlling valve, and an operation command pilot pressure is exerted on said cut-off valve from said electromagnetic proportional pressure reducing valve in accordance with a detection signal provided from said working radius detecting means.

6. A construction machine according to claim 5, wherein said electromagnetic proportional pressure controlling valve is controlled in accordance with a signal which is proportional to the detection signal provided from said working radius detecting means.

7. A construction machine according to claim 6, wherein said electromagnetic proportional pressure controlling valve is controlled in accordance with both the detection signal provided from said working radius detecting means and a signal provided non-linearly to match operability of the construction machine.

8. A construction machine comprising
a lower carriage;
an upper rotating structure mounted rotatably on said lower carriage;
a working attachment attached rotatably to said upper rotating structure;
working radius detecting means for detecting a working radius in accordance with a state of said working attachment;
rotative acceleration suppressing means for suppressing a rotative acceleration of said upper rotating structure when the working radius is found to be small by said working radius detecting means; and
maximum rotating speed suppressing means for suppressing a maximum rotating speed of said upper rotating structure when the working radius is found to be small by said working radius detecting means, wherein said rotative acceleration suppressing means and said maximum rotating speed suppressing means include a rotating direction control valve for controlling the rotation of said upper rotating structure, an arm direction control valve for controlling the rotation an arm of said working attachment, and an unloading valve connected to a traveling direction control valve for controlling the travel of said lower carriage, said unloading valve controlling bleed-off of said rotating direction control valve in accordance with a result of detection made by said working radius detecting means.

9. A construction machine according to claim 8, wherein operation of said rotating direction control valve is judged in preference to operation of said arm direction control valve.

10. A construction machine comprising:
a lower carriage;
an upper rotating structure mounted rotatably on said lower carriage;
a working attachment attached rotatably to said upper rotating structure;
load pressure detecting means for detecting a load pressure of a hydraulic cylinder having a piston and used for rotating a boom of said working attachment, the load pressure being a function of a pressure difference on opposite sides of the piston; and
rotative acceleration suppressing means for suppressing a rotative acceleration of said upper rotating structure when it is detected by said load pressure detecting means that the boom load pressure is small.

11. A construction machine comprising:
a lower carriage;
an upper rotating structure mounted rotatably on said lower carriage;
a working attachment attached rotatably to said upper rotating structure;
load pressure detecting means for detecting a load pressure of a hydraulic cylinder used for rotating a boom of said working attachment; and
maximum rotating speed suppressing means for suppressing a maximum rotating speed of said upper rotating structure when it is detected by said load pressure detecting means that the boom load pressure is small.

12. A construction machine comprising:
a lower carriage;
an upper rotating structure mounted rotatably on said lower carriage;
a working attachment attached rotatably to said upper rotating structure;
load pressure detecting means for detecting a load pressure of a hydraulic cylinder used for rotating a boom of said working attachment; and
rotative acceleration suppressing means for suppressing a rotative acceleration of said upper rotating structure when it is detected by said load pressure detecting means that the boom load pressure is small, further including maximum rotating speed suppressing means for suppressing a maximum rotating speed of said upper rotating structure when it is detected by said load pressure detecting means that the boom load pressure is small.

13. A construction machine according to claim 12, wherein said rotative acceleration suppressing means and said maximum rotating speed suppressing means include an unloading valve connected to a rotating direction control valve used for controlling rotation of said upper rotating structure, said unloading valve controlling bleed-off of said rotating direction control valve in accordance with the load pressure detected by said load pressure detecting means.

14. A construction machine according to claim 13, wherein said unloading valve is a cut-off valve adapted for opening and closing motions to control the bleed-off thereof.

15. A construction machine according to claim 14, wherein an outlet of a center bypassing oil path for the return of a main pressure oil, said center bypassing oil path extending through a neutral position of said rotating direction control valve, and an oil tank are in communication with each other through said cut-off valve.

16. A construction machine according to claim 14, wherein, when said load pressure is reduced, the bleed-off of said cut-off valve is controlled to permit opening in response to the operation of said rotating direction control valve to suppress the rotative acceleration of said upper rotating structure, and the maximum rotating speed is suppressed by controlling the bleed-off of the cut-off valve so as not to be fully dosed.

* * * * *